United States Patent
Soleimani et al.

(10) Patent No.: US 7,782,586 B2
(45) Date of Patent: Aug. 24, 2010

(54) THERMAL MANAGEMENT WITHIN MOBILE RFID READERS THROUGH THE APPLICATION OF TEMPERATURE GOVERNED VARIABLE NON-EMISSIVE INTERVALS

(75) Inventors: Mohammad Soleimani, Gaithersburg, MD (US); Martin Strzelczyk, New Market, MD (US); Son Ngo, Frederick, MD (US); Ian Chamberlin, Burtonsville, MD (US); Albert Owens, Rockville, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 547 days.

(21) Appl. No.: 11/843,548

(22) Filed: Aug. 22, 2007

(65) Prior Publication Data
US 2009/0052105 A1 Feb. 26, 2009

(51) Int. Cl.
*H02H 5/04* (2006.01)
*G08B 13/14* (2006.01)

(52) U.S. Cl. .................... 361/103; 340/572.4

(58) Field of Classification Search .................. 361/103
See application file for complete search history.

(56) References Cited

U.S. PATENT DOCUMENTS

| | | | |
|---|---|---|---|
| 7,636,031 B2 * | 12/2009 | Mirmobin et al. | 340/10.1 |
| 2005/0084003 A1 * | 4/2005 | Duron et al. | 375/221 |
| 2007/0188990 A1 * | 8/2007 | Wallace | 361/688 |
| 2008/0018483 A1 * | 1/2008 | Kang | 340/584 |

OTHER PUBLICATIONS

International Search Report and the Written Opinion of the International Searching Authority for International Application No. PCT/US2008/072975 mailed on Nov. 24, 2008.

* cited by examiner

Primary Examiner—Stephen W Jackson
Assistant Examiner—Dharti H Patel
(74) Attorney, Agent, or Firm—Glenn Frankenberger

(57) ABSTRACT

A thermal management system and method to control temperature in an RFID reader is described herein. In particular, by inserting variable periods of inactivity (or latency) at the beginning or at the end of each read cycle, proportional to an instantaneous temperature value of the RFID reader, overheating and damage of RFID reader electronics is prevented. The RFID reader includes a thermal sensor and determines when the high power RF electronics is enabled. If the RFID reader is in an over-heated condition, it can be turned OFF and during this period any requests received on an interface to the RFID reader to perform a read of tag(s) are not processed.

14 Claims, 5 Drawing Sheets

US 7,782,586 B2

THERMAL MANAGEMENT WITHIN MOBILE RFID READERS THROUGH THE APPLICATION OF TEMPERATURE GOVERNED VARIABLE NON-EMISSIVE INTERVALS

BACKGROUND OF THE INVENTION

1. Field of the Invention

The invention relates to thermal management of radio frequency identification (RFID) tag readers.

2. Background Art

Radio frequency identification (RFID) tags are electronic devices that may be affixed to items whose presence is to be detected and/or monitored. RFID tags are read or interrogated by RFID readers on which one or more interrogator antennas reside. RFID readers are conventionally kept in an ON state for a considerable portion of their operating cycles. This results in excessive power consumption and over-heating. Over-heating of the RFID reader may further lead to erroneous functioning or even worse, a permanent damage to the RFID reader's electronic circuitry rendering the RFID reader useless.

Thus, what is needed is an efficient thermal management system and method for controlling temperature variations in an RFID reader and thereby avoid over-heating and damage of the RFID reader components.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
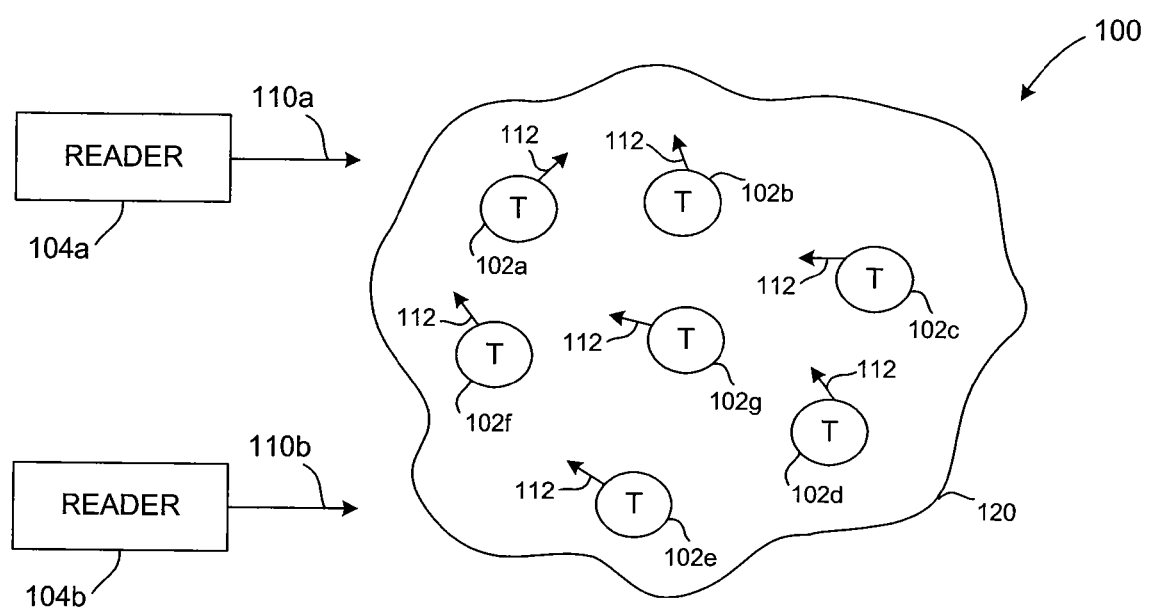
Figure 2:
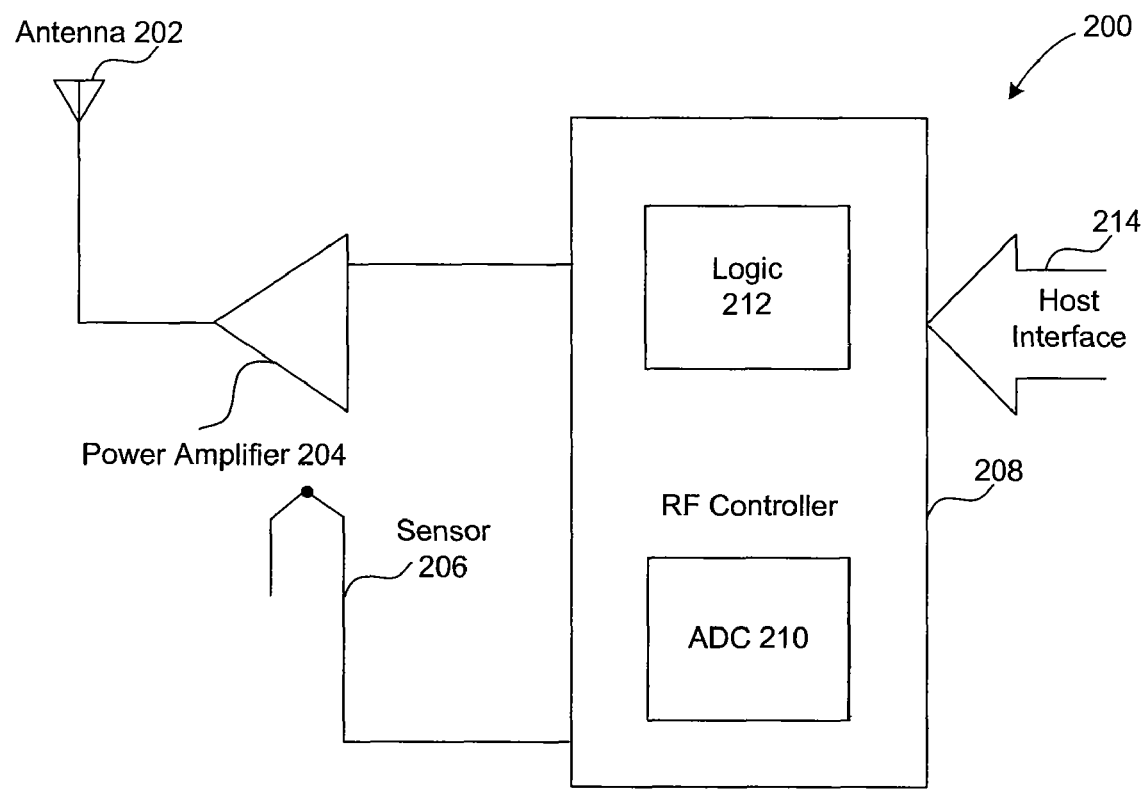

FIG. 1 illustrates an exemplary environment in which RFID readers communicate with an exemplary population of RFID tags FIG. 2. illustrates a reader schematic for thermal management of an RFID tag according to an embodiment of the present invention.

Figure 3:
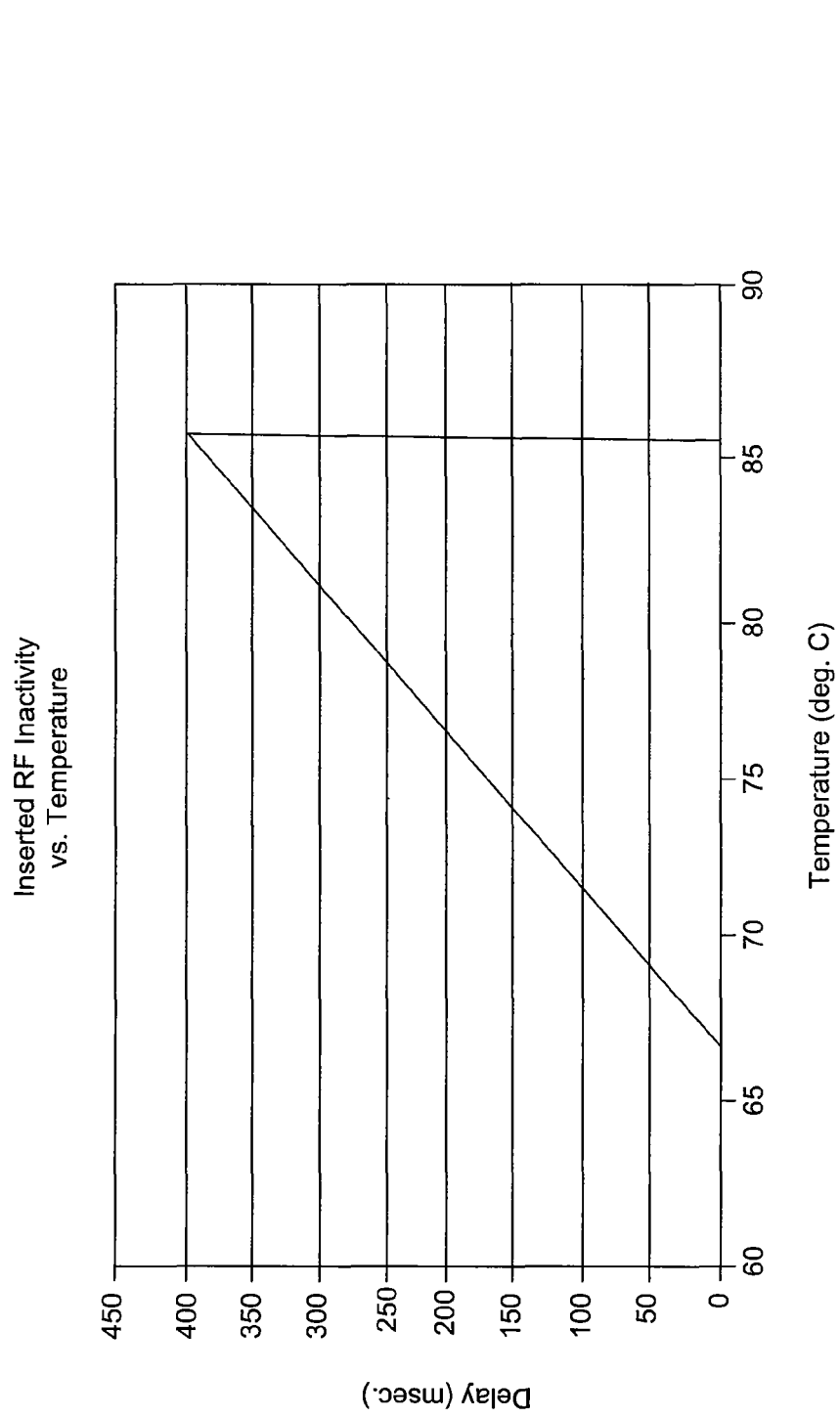

FIG. 3. illustrates variation in RF inactivity versus temperature in an RFID reader, according to an embodiment of the present invention.

Figure 4:
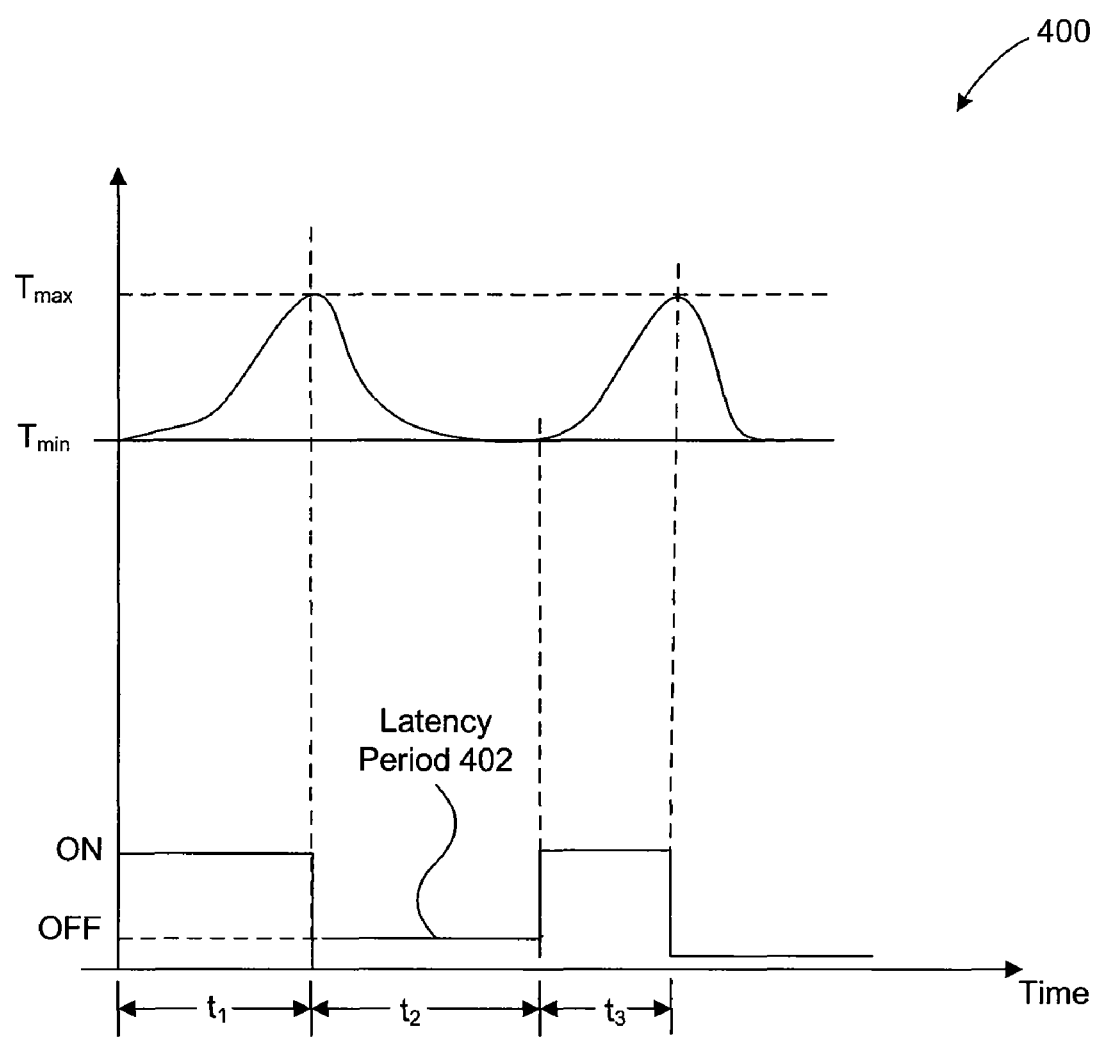

FIG. 4 illustrates a plot showing variation in the temperature of the RFID reader and the on/off duration with respect to time according to an embodiment of the present invention.

Figure 5:
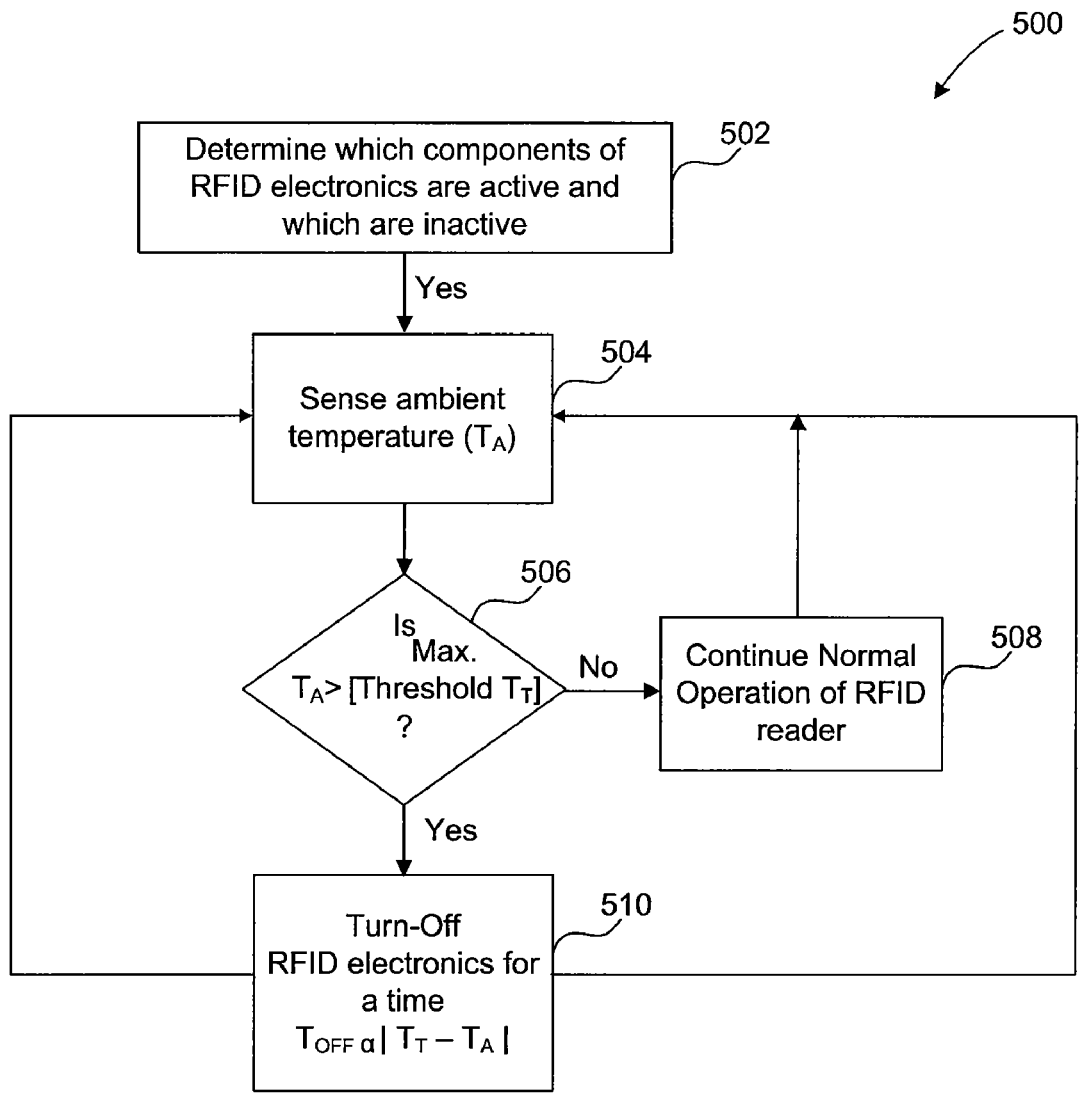

FIG. 5. illustrates a flowchart for thermal management inside an RFID reader according to various embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

A thermal management system and method to control temperature in an RFID reader is described herein. In particular, by inserting periods of inactivity (or latency) at the beginning of each read cycle, proportional to an instantaneous temperature value of the RFID reader, over-heating and damage of RFID reader electronics is prevented.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System and Environment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Example Implementation

FIG. 2 illustrates an exemplary schematic for reader 200 (also interchangeably referred to as reader schematic 200 or RFID reader 200) according to one embodiment of the present invention. Functionally, FIG. 2 illustrates a control loop configured to regulate the operation time for heavily power consuming components included in a reader 200 such that reader 200 stays within optimal operating temperature zones. Reader 200 includes an antenna 202, a power amplifier 204, a sensor 206 (also referred to as a thermal sensor 206), an RF controller 208, and a host interface 214. RF controller 208 includes an analog to digital converter (ADC) 210, a logic 212 (also interchangeably referred to as logic circuitry 202)

Reader 200 may be part of a handheld device, like a Personal Digital Assistant (PDA) or may be embedded in a handheld "gun" type scanning device. Alternatively, RFID reader 200 may be a peripheral device that supplies and/or receives data to or from a handheld device by means of host interface 214. In an exemplary embodiment, a handheld device acts as a host that issues control signals using a central controller or processor. For example, this handheld device may be mounted on a mobile fork lift reader operating in a high temperature environment. The handheld device and/or reader 200 may further communicate with a central controller which is external to both the handheld device and RFID reader 200. The central controller may be physically separated from the handheld device and/or reader 200 by a considerable distance. The central controller may or may not be a part of the same device in which reader 200 resides. A host or a handheld device may issue read requests to reader 200.

Antenna 202 is used to receive data, control signals and/or a combination of both from a central controller and/or a host handheld device. Additionally and alternatively, antenna 202 may transmit signals to a central controller (not shown in FIG. 2) as per the specific needs of the application.

In response to the read requests, antenna 202 transmits electromagnetic signals towards a population of tags, as shown in FIG. 1. Signals reflected by the tags are received by antenna 202 and sent to power amplifier 204. Signals received by antenna 202 may have background noise which might also be received by antenna 202. For example, such background noise may comprise Gaussian noise or any other type of noise well known to one skilled in the art. In addition to Gaussian noise in the reflected signals, over-heating of RFID reader 200 leads to an increase in thermal noise inherent in various passive and active electronic components in reader 200.

Power amplifier 204 amplifies signals from RF controller 208. Power amplifier 204 can be made of discrete components, integrated circuits, or a combination of both. Power amplifier 204 generates significant heat during normal operation. The heat generated by the components of reader 200 such as power amplifier 204 in combination with an increased ambient temperature of the operating environment can damage RFID reader 200 and/or can lead to malfunctioning of RFID reader 200.

Sensor 206 is configured to sense temperature variation of the operating environment and/or one or more component of reader 200 (e.g., power amplifier 204). Sensor 206 sends the measured (or, sensed) temperature to RF controller 208. Sensor 206 may include an individual sensor. Alternatively, sensor 206 includes an array of sensors. Sensor 206 may periodically measure temperature (e.g., at predetermined intervals). Additionally, or alternatively, sensor 206 measures temperature in response to a received request. Although depicted as a component of reader 200, sensor 206 may be external to reader 200.

ADC 210 is configured to convert the analog temperature measured from sensor 206 into a digital value. The temperature detected by sensor 206 may also be processed by ADC 210. ADC 210 can be, for example, a 12-bit ADC.

RF controller 208 also comprises logic 212 to process the digitally converted temperature values. Logic 212 may comprise, for example, digital logic circuitry, processor, or any other associated signal processing circuitry well known to one skilled in the art. Although, in FIG. 2, logic 212 is shown to be inside RF Controller 208, logic 212 may be part of the controller resident in a host device, like a handheld device, for example. Further still, logic circuitry 212 may be programmable locally or remotely via a Graphical User Interface (GUI) on a remote computer terminal. RF controller 208 is further configured to send the digital temperature values to an external processing component via host interface 214. Alternatively or additionally, RF controller 208 may receive control instructions or communication signals from the host or the central controller via host interface 214.

Logic 212 is configured to optimize operation of reader 200 by selectively turning off components of reader 200 based on measured temperature conditions. By means of logic 212 RF controller 208 issues a signal (e.g., an OFF or an inactive signal) causing one or more components of reader 200 to shut down. Once the components are OFF, temperature inside and around RFID reader 200 (or, ambient temperature) may begin to fall. After the ambient temperature has fallen below a predetermined threshold value, RF controller 208 may then turn ON components so that reader 200 can resume operation. Therefore, by using an ON/OFF control method, RF controller 208 is able to manage the impact of temperature on reader 200. It will be readily apparent to one skilled in the art that any other means of temperature control apart from on/off control may also be equally effective. As described herein, there may be parts or sub-modules of reader 200 that may be left ON. For example, low power devices (e.g., a time tracking device like a counter), may still be left ON to keep track of the ON/OFF time, even though the rest of the components of reader 200 are inactive. Although depicted as a component of reader 200, logic 212 may be included in a device external to reader 200.

TABLE 1

Key Temperature Ranges

| Range | Temperature | 12 bit ADC values |
| --- | --- | --- |
| Normal | Below ~67° C. | ADC ≦ 0x6C0 |
| Hot | Above ~67° C. and Below ~85° C. | 0x6C0 < ADC ≦ 0x7C0 |
| Overtemp | Above ~85° C. | 0x7C0 < ADC |

Table 1 illustrates temperature ranges in which RFID reader 200 may operate. For example, the measured temperature can be in one of three ranges—Normal, Hot, Overtemp. As would be appreciated by persons of skill in the art, other temperature ranges can be used with the present invention. Table 1 may be implemented, for example, in logic circuitry 212 by means of a state machine.

To inhibit excessive heat generation, periods of RF inactivity are inserted after completion of read cycles that fall in the Hot range shown by Table 1. The periods of RF inactivity are also known as latency periods. According to an embodiment of the invention, power amplifier 204 tends to be the hottest component of reader 200 when a read cycle is being performed. Therefore, sensor 206 in this case, may sense the temperature of power amplifier 204. However, it will be readily apparent to one skilled in the art that other components can also be protected from over-heating in a similar fashion. Thus, for example, reader 200 may have a plurality or an array of sensors similar to sensor 206, corresponding to various electronic components of reader 200, that sense temperature and communicate with RF Controller 208. Further, reader 200 may include additional circuitry to control such an array of sensors during various sensing operations.

FIG. 3 illustrates an exemplary RF inactivity vs. Temperature curve 300, according to an embodiment of the present invention. As can be seen in FIG. 3, RFID reader 200 is turned on with an increasing delay as temperature increases or approaches an upper threshold limit. The delay provides an opportunity for reader 200 to start cooling down, before being turned on again. For example, below 67° C. (normal range) there is no delay in turning on RFID reader 200. This means that read requests received by reader 200 are acknowledged and reads are performed by RFID reader 200 without any added delay. However, between 67° C. and 85° C. (hot range), an increasing delay is inserted by RF controller 208 before read operations are resumed. For example, according to one embodiment of the present invention, for each 16 lowest significant bits above peak measurement of ADC 210, 25 ms of delay is added in turning on RFID reader 200. If the sensed temperature exceeds 85° C. (overtemp range), reader 200 is completely shut-down. In this overtemp operational state, empty interim data packets may be generated by RFID reader 200 to comply with various protocols requirements for reader communication. During this period when empty packets are being inserted, reader 200 cannot receive read requests. Details of such empty interim packets are well known to those skilled in the art and will depend on specific communication protocols. According to one embodiment of the present invention, the delay in turning the RFID reader on again may peak at 400 ms. Although Table 1 shows only 12-bit values for ADC 210, higher or lower bit values will depend on required resolution and accuracy of temperature measurement, as can be easily contemplated by one skilled in the art. Further still, although the delay is shown in milliseconds and the temperature is shown in degrees Celsius in FIG. 3, other units of measurement can easily be contemplated.

Referring now to FIG. 4, an exemplary temperature variation vs. time and an on/off variation vs. time plot 400 is shown, according to an embodiment of the present invention. As can be seen in FIG. 4, temperature varies between a first and a second preset threshold $T_{min}$ and $T_{max}$, respectively. $T_{min}$ and $T_{max}$ correspond to the minimum and the maximum temperatures that are measured, respectively. In the same plot, periods of RF activity and RF inactivity are shown. During time period $t_1$, the temperature of RFID reader 200 increases from $T_{min}$ to $T_{max}$. Further, during this period RFID reader 200 is in an ON state. Once maximum temperature $T_{max}$ is obtained, one or more components of reader 200 are turned OFF, as shown by period $t_2$. Period $t_2$, when RFID reader 200 is OFF, is also known as latency period 402. During period $t_2$, once temperature has fallen below the second threshold value $T_{min}$, one or more components of reader 200 are turned on again. This is shown as period $t_3$. This ON/OFF cycle is repeated depending on the monitored temperature variations.

During latency period 402, when RFID reader 200 is in an off state, RFID reader 200 cools down. Thus, by varying the idle period and the on period of RFID reader 200, there is obtained a duty cycle variation in the operation of RFID reader 200. Sensor 206 senses the ambient temperature during an on/off cycle or at the beginning of every read cycle, as per specific needs.

FIG. 5 illustrates a flowchart 500 of an exemplary method for managing thermal variation inside RFID reader 200, according to various embodiments of the present invention. Flowchart 500 is described with reference to the exemplary embodiment depicted in FIG. 2. However, flowchart 500 is not limited to that embodiment. Note that some of the steps in flowchart 500 do not necessarily have to occur in the order shown.

Prior to a read cycle performed by reader 200, an internal check might be executed by reader 200 to gauge which components are active and which are inactive, as shown in step 502. This check may, for example, be used to control various sensors that might be associated with various components or modules of reader 200's internal circuitry. According to another embodiment of the present invention, such a check may also be executed during or after a read cycle.

In step 504, sensed temperature measurements are received. As described earlier in the specification, the sensed ambient temperature $T_a$ is sent to RF controller 208. Note that RF controller 208 may be receiving temperature values at periodic intervals from sensor 206.

In step 506, a determination is made whether reader 200 is operating in a region requiring intervention. If reader 200 is operating in a normal region, normal operation continues (step 508). If reader 200 is operating in a region requiring intervention, operation proceeds to step 510.

In step 510, an OFF period is selected based on the determined region of operation. For example, if the measured temperature is greater than maximum threshold $T_t$, reader 200 is turned off for an extended time period. However, if the measured temperature is within a specific range, the time during which one or more reader components is turned off, is proportional to the absolute temperature difference between the maximum threshold temperature $T_t$ and the ambient temperature $T_a$. That is, off time $T_{OFF}$ is proportional to absolute value of $T_t - T_a$, as shown in step 510.

After the "OFF" period selected in step 510 has expired, operation returns to step 504. Flowchart 500 is repeated continuously or periodically during operation of reader 200.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for optimizing the operation of a radio frequency identifier (RFID) reader, comprising:
   a thermal sensor configured to detect a temperature of an operating environment of the radio frequency identifier reader;
   a controller configured to selectively turn off one or more components of the reader for a period between read operations, wherein a length of the period is based on the detected temperature.

2. The system of claim 1, wherein a component of the reader turned off includes a power amplifier.

3. The system of claim 1, further including a second thermal sensor configured to detect a temperature of a component of the reader.

4. The system of claim 1, wherein the component of the reader is a power amplifier.

5. The system of claim 4, wherein the controller includes programmable logic to alter a duty cycle of the power amplifier.

6. The system of claim 1, wherein the controller includes an analog to digital converter (ADC) coupled to an analog output of the thermal sensor.

7. The system of claim 6, wherein the ADC converts the analog output of the thermal sensor into a digital value corresponding to at least one of a normal temperature range, a hot temperature range and an over-temperature range.

8. A method for optimizing the operation of a radio frequency identification (RFID) reader, comprising:
   sensing a temperature associated with an operating environment of the radio frequency identifier reader;
   determining whether the sensed temperature indicates that the reader is operating in a non-optimal region; and
   if the reader is operating in a non-optimal region, selecting a length for a time period during which the reader is inactive, wherein a length of the time period is based on the sensed temperature; and
   placing one or more components of the reader into an inactive state for the duration of the time period.

9. The method of claim 8, further comprising:
   placing the one or more components of the reader into an active state after the time period has elapsed.

10. The method of claim 8, wherein the step of determining comprises:
    comparing the sensed temperature with preset temperature thresholds.

11. The method of claim 8, further comprising:
    sensing a temperature of a component of a component of the reader.

12. The method of claim 11, wherein the length of the time period is based on the temperature of the operating environment and the temperature of the component.

13. The method of claim 11, further comprising:
    sensing a temperature of a power amplifier of the reader.

14. A system for optimizing the operation of a radio frequency identification (RFID) reader, comprising:
    means for sensing a temperature associated with an operating environment of the radio frequency identifier reader;
    means for determining whether the sensed temperature indicates that the reader is operating in a non-optimal region; and
    means for selecting a length for a time period during which the reader is inactive if the reader is operating in a non-optimal region, wherein a length of the time period is based on the sensed temperature; and
    means for placing one or more components of the reader into an inactive state for the duration of the time period.

* * * * *